United States Patent [19]
Short et al.

[11] Patent Number: 5,518,084
[45] Date of Patent: May 21, 1996

[54] PORTABLE STEP

[76] Inventors: John W. Short; Margaret V. Short, both of 45465 25th St. E., SP 198,, Lancaster, Calif. 93535

[21] Appl. No.: 344,216

[22] Filed: Nov. 23, 1994

[51] Int. Cl.$^6$ ...................................................... A47B 46/00
[52] U.S. Cl. ............................ 182/223; 182/33; 108/132; 297/423.39
[58] Field of Search ........................ 182/222, 223, 182/15–17, 113, 33, 35; 108/132; 297/423.39, 423.41; 190/115

[56] References Cited

U.S. PATENT DOCUMENTS

| | | | |
|---|---|---|---|
| 1,133,109 | 3/1915 | Derbyshire | 108/132 |
| 3,628,471 | 12/1971 | Burr | 108/132 |
| 3,826,336 | 7/1974 | Cramer | 182/15 |
| 4,059,058 | 11/1977 | Kazuhide | 108/152 X |
| 5,316,374 | 5/1994 | Fidler | 297/423.39 |
| 5,323,887 | 6/1994 | Scicluna | 190/115 X |

*Primary Examiner*—Alvin C. Chin-Shue

[57] ABSTRACT

A new and improved portable step comprising a top platform having a front portion that extends downwardly therefrom. The top platform has a metal edging around a periphery thereof. The metal edging serves to protect the periphery from chipping and splitting. Included in the device are two side supports. Each of the two side supports has a spring loaded hinge theresecured. Each spring loaded hinge is secured to the top platform. Each of the two side supports is extendable to a position perpendicular to the top platform. Each of the two side supports is foldable to a position against the top platform. A front support is hingedly secured to the front portion of the top platform. The front support is extendable to a position perpendicular to the top platform resting against the two side supports. The front support is foldable to a position retaining the two side supports against the top platform.

1 Claim, 4 Drawing Sheets

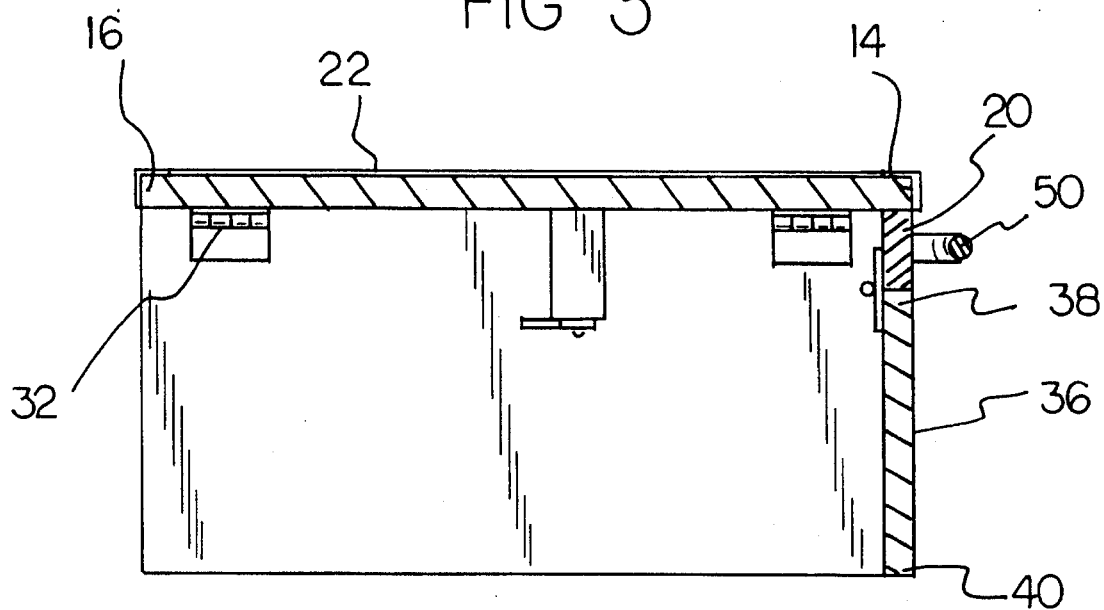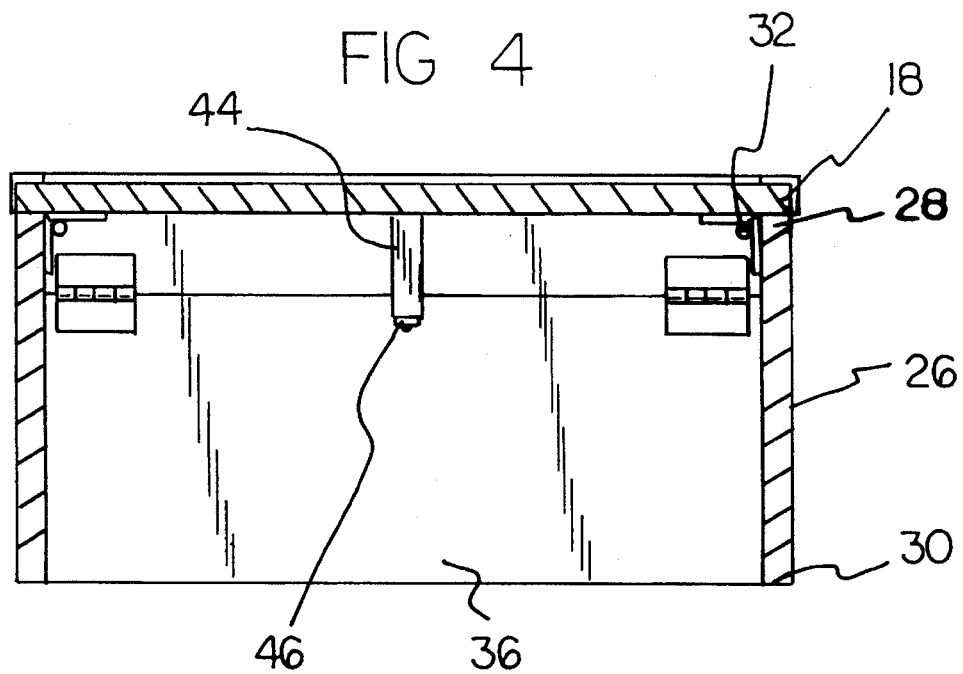

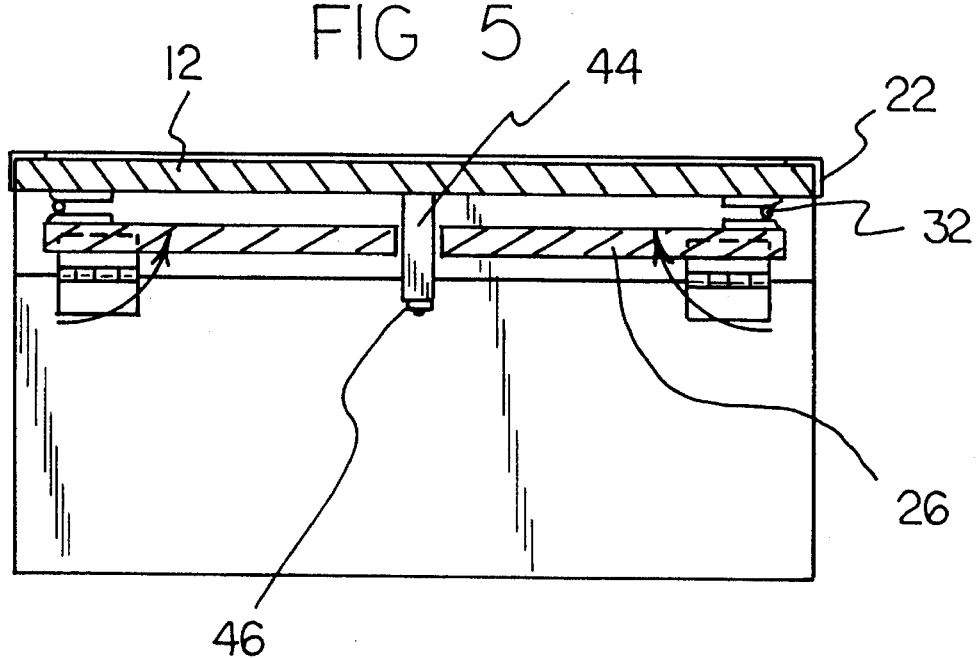
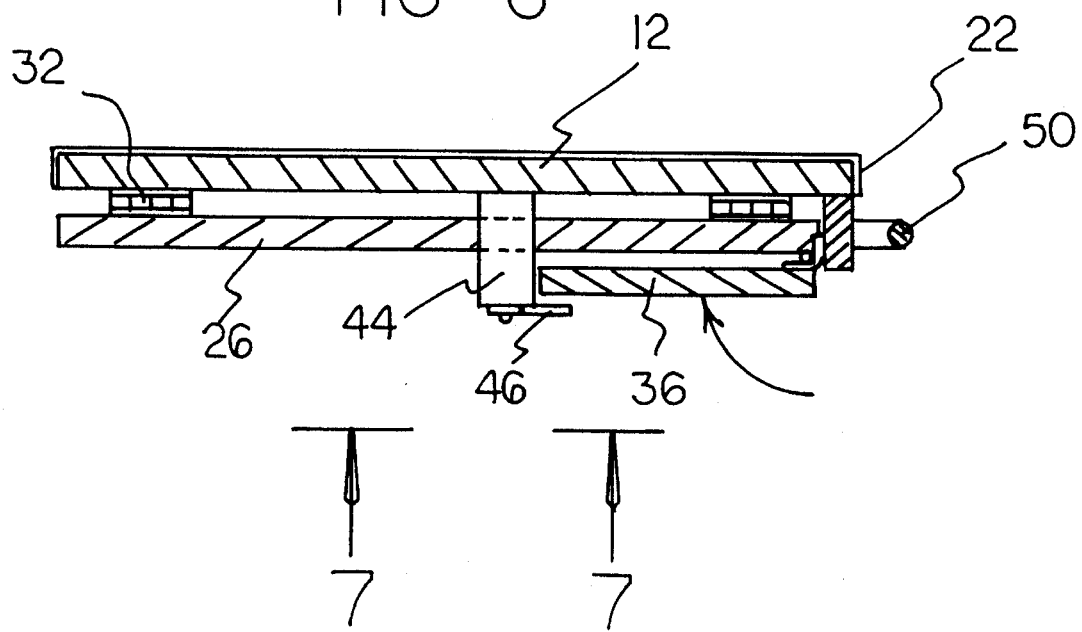

1

PORTABLE STEP

BACKGROUND OF THE INVENTION

1. Field of the Invention

The present invention relates to a portable step and more particularly pertains to providing a step of an intermediate height for use with buses, small aircraft, and the like with a portable step.

2. Description of the Prior Art

The use of step stools is known in the prior art. More specifically, step stools heretofore devised and utilized for the purpose of providing access to greater heights are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,290,502 to Anderson discloses a folding step stool.

U.S. Pat. No. 4,034,829 to Hoffman discloses a step stool.

U.S. Pat. No. 3,999,629 to Schaffer et al. discloses a foldable step stool.

U.S. Pat. No. 3,833,089 to Backwell discloses a foldable step stool.

U.S. Pat. No. 3,841,437 to Caughey discloses a portable step stool.

While these devices fulfill their respective, particular objective and requirements, the aforementioned patents do not describe a portable step for providing a step of an intermediate height for use with buses, small aircraft, and the like.

In this respect, the portable step according to the present invention substantially departs from the conventional concepts and designs of the prior art, and in doing so provides an apparatus primarily developed for the purpose of providing a step of an intermediate height for use with buses, small aircraft, and the like.

Therefore, it can be appreciated that there exists a continuing need for new and improved portable step which can be used for providing a step of an intermediate height for use with buses, small aircraft, and the like. In this regard, the present invention substantially fulfills this need.

SUMMARY OF THE INVENTION

In the view of the foregoing disadvantages inherent in the known types of step stools now present in the prior art, the present invention provides an improved portable step. As such, the general purpose of the present invention, which will be described subsequently in greater detail, is to provide a new and improved portable step and method which has all the advantages of the prior art and none of the disadvantages.

To attain this, the present invention essentially comprises a top platform having an upper surface, a lower surface, a front edge, a back edge, and two side edges. The lower surface of the front edge has a front portion that extends downwardly therefrom. The front portion has two apertures formed therethrough. The upper surface has a non-slip material thereon. The top platform has a metal edging around a periphery thereof. The metal edging serves to protect the periphery from chipping and splitting. The device contains two side supports. Each of the two side supports has an upper edge and a lower edge. Each upper edge has a spring loaded hinge theresecured. Each spring loaded hinge is secured to the lower surface of the two side edges of the top platform. Each of the two side supports is extendable to a position perpendicular to the top platform. Each of the two side supports is foldable to a position against the lower surface of the top platform. The device includes a front support having an upper edge and a lower edge. The upper edge is hingedly secured to the front portion of the top platform. The front support is extendable to a position perpendicular to the top platform resting against the two side supports. The front support is foldable to a position that will retain the two side supports against the lower surface of the top platform. The device contains a lock mechanism secured to a middle portion of the lower surface of the top platform. The lock mechanism has a rotatable tab that extends therefrom. The rotatable tab optionally couples with the lower edge of the front support to retain the front support and the two side supports in a closed position. The rotatable tab optionally releases the front support thereby releasing the two side supports to an erected position. A handle is telescopically received within the two apertures formed through the front portion of the top platform. The handle serves to allow a user to easily transport the device.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable step which has all the advantages of the prior art step stools and none of the disadvantages.

It is another object of the present invention to provide a new and improved portable step which may be easily and efficiently manufactured and marketed.

It is a further object of the present invention to provide a new and improved portable step which is of durable and reliable construction.

An even further object of the present invention is to provide a new and improved portable step which is susceptible of a low cost of manufacture with regard to both materials and labor, and which accordingly is then susceptible of low prices of sale to the consuming public, thereby making such a portable step economically available to the buying public.

Still yet another object of the present invention is to provide a new and improved portable step which provides in the apparatuses and methods of the prior art some of the advantages thereof, while simultaneously overcoming some of the disadvantages normally associated therewith.

Even still another object of the present invention is to provide a new and improved portable step for providing a step of an intermediate height for use with buses, small aircraft, and the like.

Lastly, it is an object of the present invention to provide a new and improved portable step comprising a top platform having a front portion that extends downwardly therefrom. The top platform has a metal edging around a periphery thereof. The metal edging serves to protect the periphery from chipping and splitting. Included in the device are two side supports. Each of the two side supports has a spring loaded hinge theresecured. Each spring loaded hinge is secured to the top platform. Each of the two side supports is extendable to a position perpendicular to the top platform. Each of the two side supports is foldable to a position against the top platform. A front support is hingedly secured to the front portion of the top platform. The front support is extendable to a position perpendicular to the top platform resting against the two side supports. The front support is foldable to a position retaining the two side supports against the top platform.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view as taken along line 3—3 of FIG. 2.

FIG. 4 is a cross-sectional view as taken along line 4—4 of FIG. 2.

FIG. 5 is a rear elevation view of the present invention.

FIG. 6 is side elevation view of the present invention.

The same reference numerals refer to the same parts through the various Figures.

DESCRIPTION OF THE PREFERRED EMBODIMENT

Figure 1:
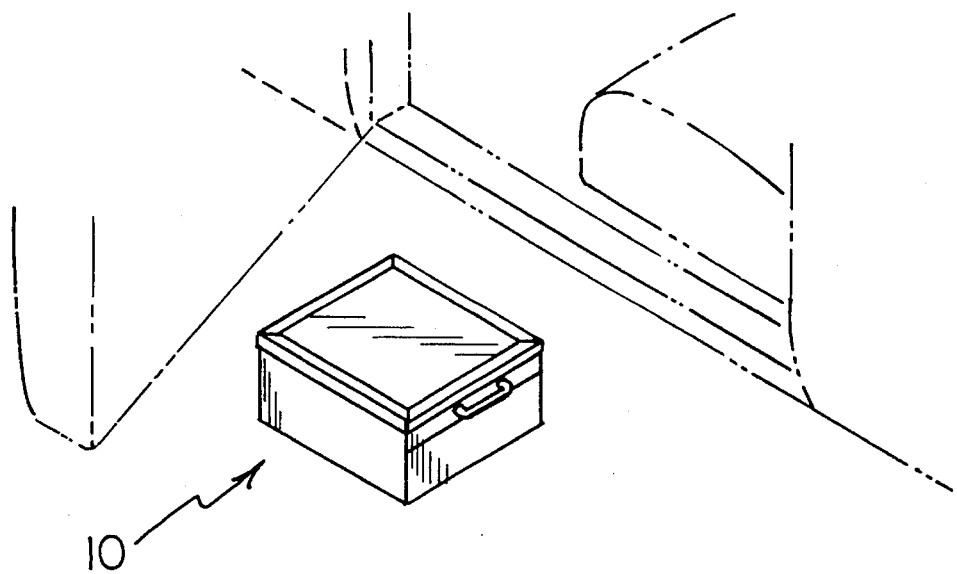
FIG. 1 is a perspective view of the preferred embodiment of the portable step constructed in accordance with the principles of the present invention.
Figure 2:
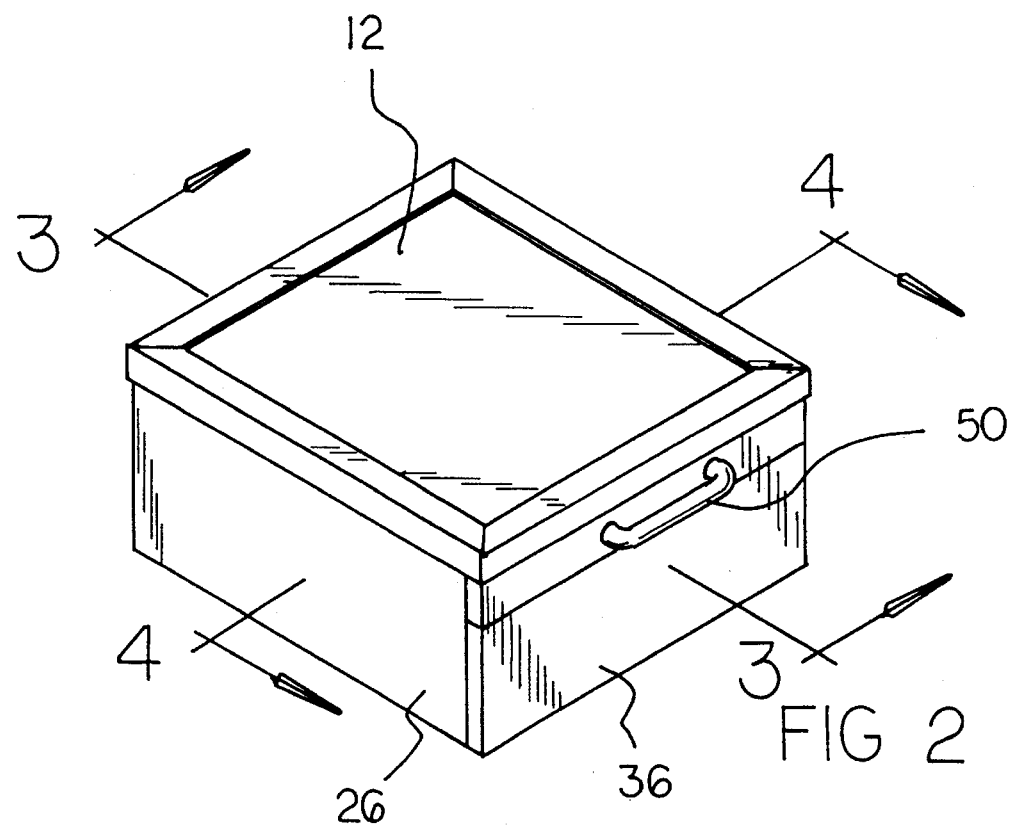
FIG. 2 is a perspective elevation view of the present invention.
Figure 7:
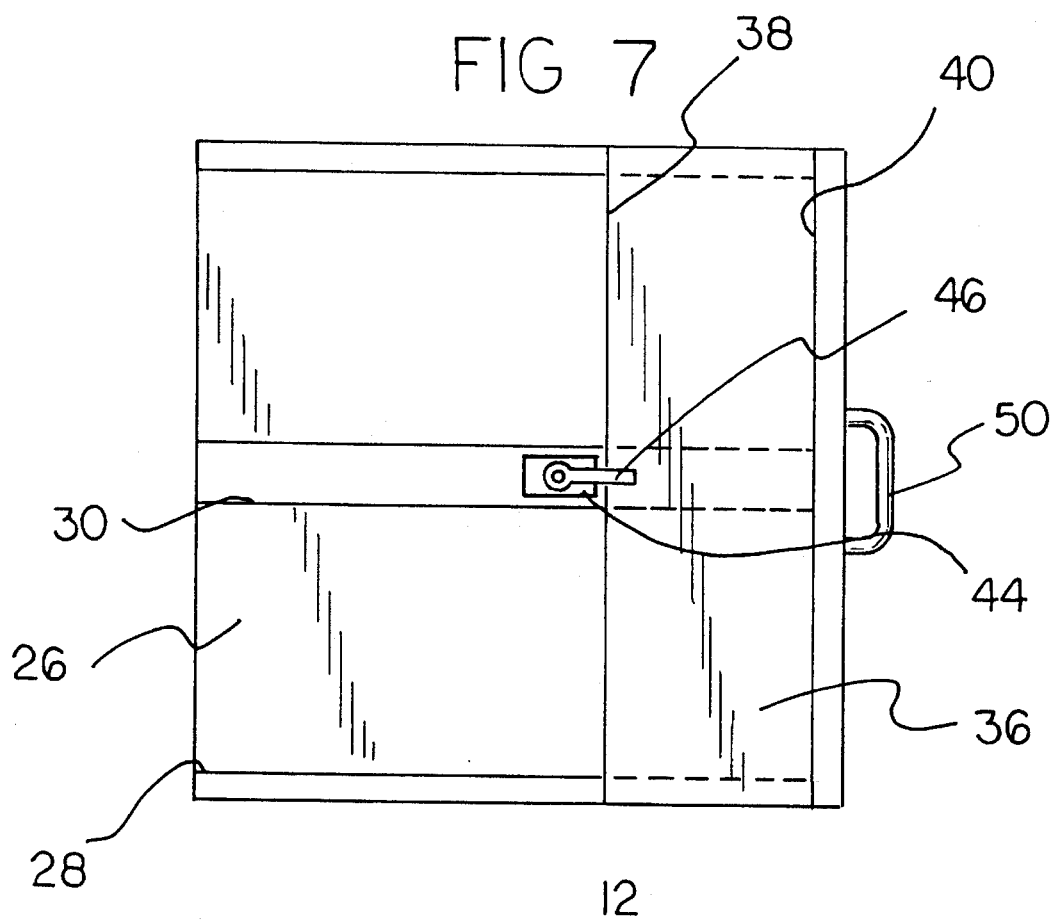
FIG. 7 is a cross-sectional view as taken along line 7—7 of FIG. 6.
Figure 8:
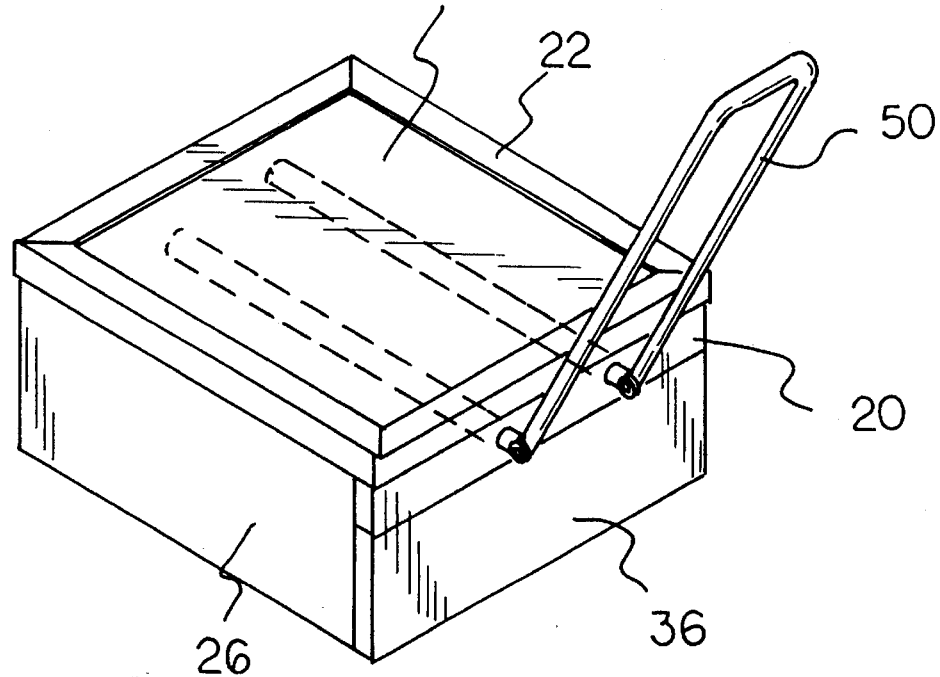
FIG. 8 is a perspective view of the present invention with the extended handle.

With reference now to the drawings, and in particular, to FIG. 1 thereof, the preferred embodiment of the new and improved portable step embodying the principles and concepts of the present invention and generally designated by the reference number 10 will be described.

Specifically, it will be noted in the various Figures that the device relates to a new and improved portable step for providing a step of an intermediate height for use with buses, small aircraft, and the like. In its broadest context, the device consists of a top platform, two side supports, a front support, a lock mechanism, and a handle.

The device 10 contains a top platform 12 having an upper surface, a lower surface, a front edge 14, a back edge 16, and two side edges 18. The lower surface of the front edge 14 has a front portion 20 that extends downwardly therefrom. The front portion 20 has two apertures formed therethrough. The upper surface has a non-slip material thereon. The non-slip material allows a person to safely step on the top platform 12 without risk of slipping and falling. The top platform 12 is preferably fabricated of wood, but could be fabricated of other strong and rigid materials. The top platform 12 has a metal edging 22 around a periphery thereof. The metal edging 22 serves to protect the periphery from chipping and splitting.

The device 10 contains two side supports 26. Each of the two side supports 26 has an upper edge 28 and a lower edge 30. Each upper edge 28 has a spring loaded hinge 32 theresecured. Each spring loaded hinge 32 is secured to the lower surface of the two side edges 18 of the top platform 12. Each of the two side supports 26 is extendable to a position perpendicular to the top platform 12. Each of the two side supports 26 is foldable to a position against the lower surface of the top platform 12. The spring loaded hinge 32 serves to position the two side supports 26 in the position perpendicular to the top platform 12. The two side supports 26 are fabricated of a hard wood such as oak or maple, but could also be fabricated of other hard woods or of a rigid plastic.

The device 10 includes a front support 36 having an upper edge 38 and a lower edge 40. The upper edge 38 is hingedly secured to the front portion 20 of the top platform 12. The front support 36 is extendable to a position perpendicular to the top platform 12 resting against the two side supports 26. The front support 36 is foldable to a position that will help retain the two side supports 26 against the lower surface of the top platform 12. As with the two side supports 26, the front support 36 is fabricated of a hard wood such as oak or maple, but could also be fabricated of other hard woods or of a rigid plastic.

The device 10 contains a lock mechanism 44 secured to a middle portion of the lower surface of the top platform 12. The lock mechanism 44 has a rotatable tab 46 that extends therefrom. The rotatable tab 46 optionally couples with the lower edge 40 of the front support 36 to retain the front support 36 and the two side supports 26 in a closed position. The rotatable tab 46 optionally releases the front support 36 thereby releasing the two side supports 26 to an erected position. By releasing the tab 46, the front support 36 is folded to a position perpendicular to the top platform 12 and the spring loaded hinge 32 of the two side supports 26 extend the two side supports 26 perpendicular to the top platform 12 and adjacent to the front support 36 to allow a user to step onto the top platform 12 to board a bus or airplane.

A handle 50 is telescopically received within the two apertures formed through the front portion 20 of the top platform 12. The handle 50 serves to allow a user to easily transport the device 10. The handle 50 can be pushed within the step when the device 10 is in use or extended out of the two apertures to allow the device 10 to be carried.

The present invention is a compact portable step which provides a step of an intermediate height for use with buses, small aircraft, etc.

The device 10 consists of a plastic handle 50, a top platform 12, side supports 26, a non-slip surface, regular and spring-loaded hinges 32, a lock mechanism 44, metal edging 22, and a front support 36. The side supports 26 are fastened to the top platform 12 with the spring-loaded hinges 32. A locking tab 46 attached to the front support 36 holds down the side supports 26 when the device 10 is in the collapsed position. A non-slip surface is attached to the outer surface of the top platform 12 and metal edging 22 is attached to the edges to protect them from chipping and splitting. The handle 50 is fastened to the front edge of the top platform 12.

The present invention is set up by unfastening the locking tabs 46 and pulling out the side supports 26. Pull the front support 36 out, and rest it against the side supports 26. Place the step near the entrance to a bus, small aircraft, pickup truck, etc., with the top platform 12 facing up.

The device 10 provides anyone who has trouble getting into large vehicles with an intermediate step that is collapsible and portable. It could be used by airlines and bus companies, but could also be purchased by individuals who would use it when getting into and out of the bathtub, as well as when traveling.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A new and improved portable step for providing a step of an intermediate height for use with buses, small aircraft, and the like comprising, in combination:

a top platform having an upper surface, a lower surface, a front edge, a back edge, and two side edges, the lower surface of the front edge having a front portion extending downwardly therefrom, the front portion having two apertures formed therethrough, the upper surface having a non-slip material thereon, the top platform having a metal edging around a periphery thereof, the metal edging serving to protect the periphery from chipping and splitting;

two side supports, each of the two side supports having an upper edge and a lower edge, each upper edge having a spring loaded hinge theresecured, each spring loaded hinge secured to the lower surface of the two side edges of the top platform, each of the two side supports extendable to a position perpendicular to the top platform, each of the two side supports foldable to a position against the lower surface of the top platform;

a front support having an upper edge and a lower edge, the upper edge hingedly secured to the front portion of the top platform, the front support extendable to a position perpendicular to the top platform resting against the two side supports, the front support foldable to a position helping to retain the two side supports against the lower surface of the top platform;

a lock mechanism secured to a middle portion of the lower surface of the top platform and downwardly extending therefrom, the lock mechanism having a rotatable tab extending therefrom, the rotatable tab optionally coupling with the lower edge of the front support to retain the front support and the two side supports in a closed position, the rotatable tab optionally releasing the front support thereby releasing the two side supports to an erected position;

a handle telescopically received within the two apertures formed through the front portion of the top platform, the handle serving to allow a user to easily transport the device.

* * * * *